United States Patent [19]

Miyamoto et al.

[11] Patent Number: 5,678,085
[45] Date of Patent: Oct. 14, 1997

[54] CAMERA EQUIPPED WITH DATA IMPRINTING DEVICE

[75] Inventors: Hidenori Miyamoto; Isao Soshi, both of Tokyo, Japan

[73] Assignee: Nikon Corporation, Tokyo, Japan

[21] Appl. No.: 763,659

[22] Filed: Dec. 11, 1996

Related U.S. Application Data

[63] Continuation of Ser. No. 436,160, May 8, 1995, abandoned, which is a continuation-in-part of Ser. No. 952,580, Sep. 28, 1992, abandoned.

[30] Foreign Application Priority Data

| Sep. 28, 1991 | [JP] | Japan | 3-276879 |
| Oct. 18, 1991 | [JP] | Japan | 3-298017 |
| Oct. 31, 1991 | [JP] | Japan | 3-286640 |

[51] Int. Cl.$^6$ .................................................. G03B 17/24
[52] U.S. Cl. .................................. 396/318; 396/436
[58] Field of Search ................................ 396/315, 316, 396/317, 318, 406, 435, 436

[56] References Cited

U.S. PATENT DOCUMENTS

| 4,265,526 | 5/1981 | Ueda et al. | 396/317 X |
| 4,268,143 | 5/1981 | Dearing et al. | 396/315 |
| 4,751,538 | 6/1988 | Konno | 396/543 |
| 4,994,830 | 2/1991 | Harvey | 396/317 X |
| 5,010,357 | 4/1991 | Misawa | 396/435 X |
| 5,019,843 | 5/1991 | Ogawa et al. | 396/318 |
| 5,086,311 | 2/1992 | Naka et al. | 396/436 |
| 5,182,590 | 1/1993 | Kaihara et al. | 396/318 |

FOREIGN PATENT DOCUMENTS 2-304538  12/1990  Japan.

*Primary Examiner*—Howard B. Blankenship
*Attorney, Agent, or Firm*—Morrison Law Firm

[57] ABSTRACT

A camera with a data imprinting device includes a generally triangular space adjacent a film spool. A roller, used to conform the film to the film spool is urged into the triangular space when the film diameter on the roller approaches a maximum diameter. A portion of an optical system for the data imprinting device is also located in the triangular space. The periods of film drive pulses are averaged to establish periods of data imprinting pulses. A plurality of the data imprinting pulses are generated for each film drive pulse. In a full size mode of operation, a first set of the data imprinting pulses are used to record imprinting data. In a panorama mode of operation, a second set of the data imprinting pulses are used to record the imprinting data. The second set of data imprinting pulses contains more data imprinting pulses than the first set of data imprinting pulses, whereby the data imprinted in panorama mode occupies a shorter length of the film than does the data imprinted in full size mode.

8 Claims, 16 Drawing Sheets

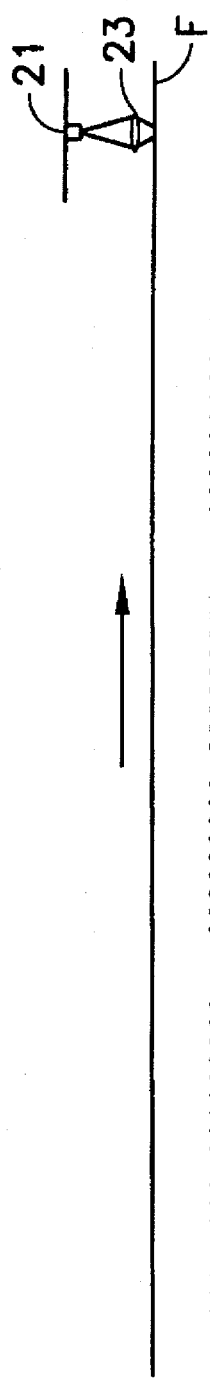
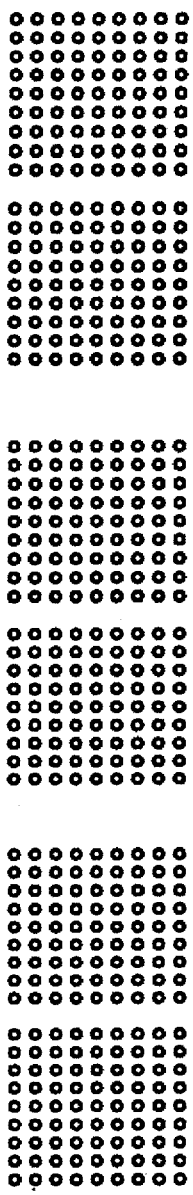
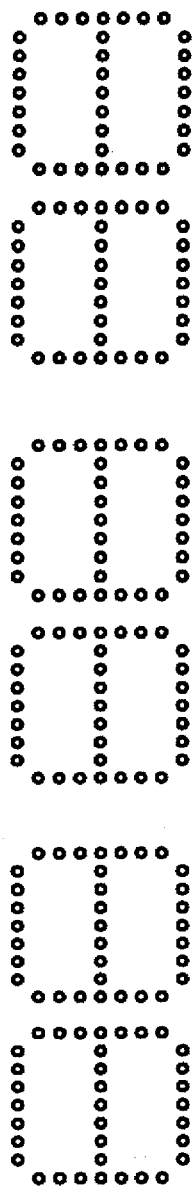
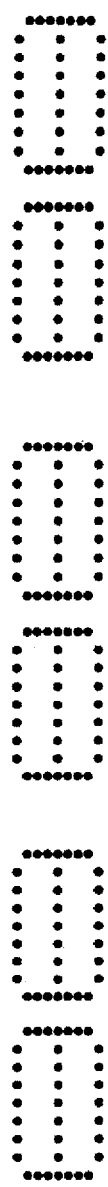
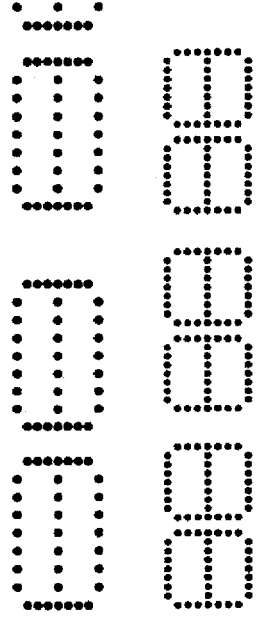
FIG.11a FIG.11b FIG.11c FIG.11d

CAMERA EQUIPPED WITH DATA IMPRINTING DEVICE

This is a Continuation of application Ser. No. 08/436,160 filed May 8, 195 (abandoned), which was a Continuation-in-part of application Ser. No. 08/952,580 filed Sep. 28, 1992 (abandoned).

BACKGROUND OF THE INVENTION

This invention relates to a camera equipped with a data imprinting device which is disposed at a side of a camera body.

A camera equipped with a data imprinting device is disclosed in Japanese Laid-open Patent Publication No. 2-304538. The data imprinting device disclosed in this publication comprises a substrate having a light emitting element and its driving means, which is disposed on an outer periphery of a spool chamber of a camera body or on an outer periphery of a cartridge thereof. A rectangular space is formed on a photographic optical axis between a dark chamber of the camera body and the spool chamber. The rectangular space includes an optical means for transferring light from the light emitting element to a surface of a film.

According to such a conventional camera, the optical means of the data imprinting system is disposed in the rectangular space formed between the dark chamber of the camera body and the spool chamber, so that a width of the camera must be increased by the width of the rectangular space. Thus a data imprinting device according to the prior art absolutely requires a special space in the camera.

OBJECTS AND SUMMARY OF THE INVENTION

It is therefore a main object of this invention to provide a camera equipped with a data imprinting device, in which the width dimension of the camera need not be enlarged.

Briefly stated, the present invention provides camera with a data imprinting device including a generally triangular space adjacent a film spool. A roller, used to conform the film to the film spool is urged into said triangular space when the film diameter on the roller approaches a maximum diameter. A portion of an optical system for the data imprinting device is also located in the triangular space. The periods of film drive pulses are averaged to establish periods of data imprinting pulses. A plurality of the data imprinting pulses are generated for each fill drive pulse. In a full size mode of operation, a first set of the data imprinting pulses are used to record imprinting data. In a panorama mode of operation, a second set of the data imprinting pulses are used to record the imprinting data. The second set of data imprinting pulses contains more data imprinting pulses than the first set of data imprinting pulses, whereby the data imprinted in panorama mode occupies a shorter length of the film than does the data imprinted in full size mode.

According to an embodiment of the invention, there is provided a camera comprising: means for selecting at least one of a first screen size and a second screen size, means for producing a feeding pulse signal, means, responsive to the feeding pulse signal for feeding a film, means for generating a first data imprinting signal having a first period when the first screen size is selected, means for generating a second data imprinting signal having a second period when the second screen size is selected, the first and second periods being related to a period of the feeding pulse signal, and means, responsive to one of the first and second data imprinting signals for imprinting data in a screen on the film as it is advanced by the means for feeding a film.

According to a feature of the invention, there is provided a camera comprising: a camera body, a plurality of light emitting elements, optical means for focussing light emitted from the plurality of light emitting elements on a surface of a photosensitive means, means for forming imprinted data from the light focussed on the surface of the photosensitive means, means for exposing the surface of the photosensitive means to light from an object to be photographed, a spool, the photosensitive means being wound on the spool, a maximum circle of the photosensitive means wound on the spool forming, with an interior of the camera body, a generally triangular shaped space, and at least a portion of the optical means being disposed in the generally triangular space, whereby an outside dimension of the camera is reduced.

According to a further feature of the invention, there is provided apparatus for imprinting data in a camera, the camera being of a type capable of exposing a photosensitive medium in at least a full size mode and a panorama mode, comprising: first means for generating first pulses, means, responsive to the first pulses for advancing the photosensitive medium, means for calculating an average period between the first pulses, second means for generating second pulses, the second means including means for generating at least a first and a second of the second pulses for each of the first pulses, third means, responsive to the first of the second pulses for energizing a plurality of sources of light in a pattern effective to imprint a first pattern of data on the photosensitive medium, fourth means, responsive to both the first and the second of the second pulses for energizing the plurality of sources of light in a pattern effective to imprint a second pattern of data on the photosensitive medium, and the first pattern having a length substantially equal to an integral multiple of the second pattern.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 11a through 11d are figures to which reference will be made in discussing dot-matrix data imprinting.

DETAILED DESCRIPTION OF THE INVENTION

Figure 1:
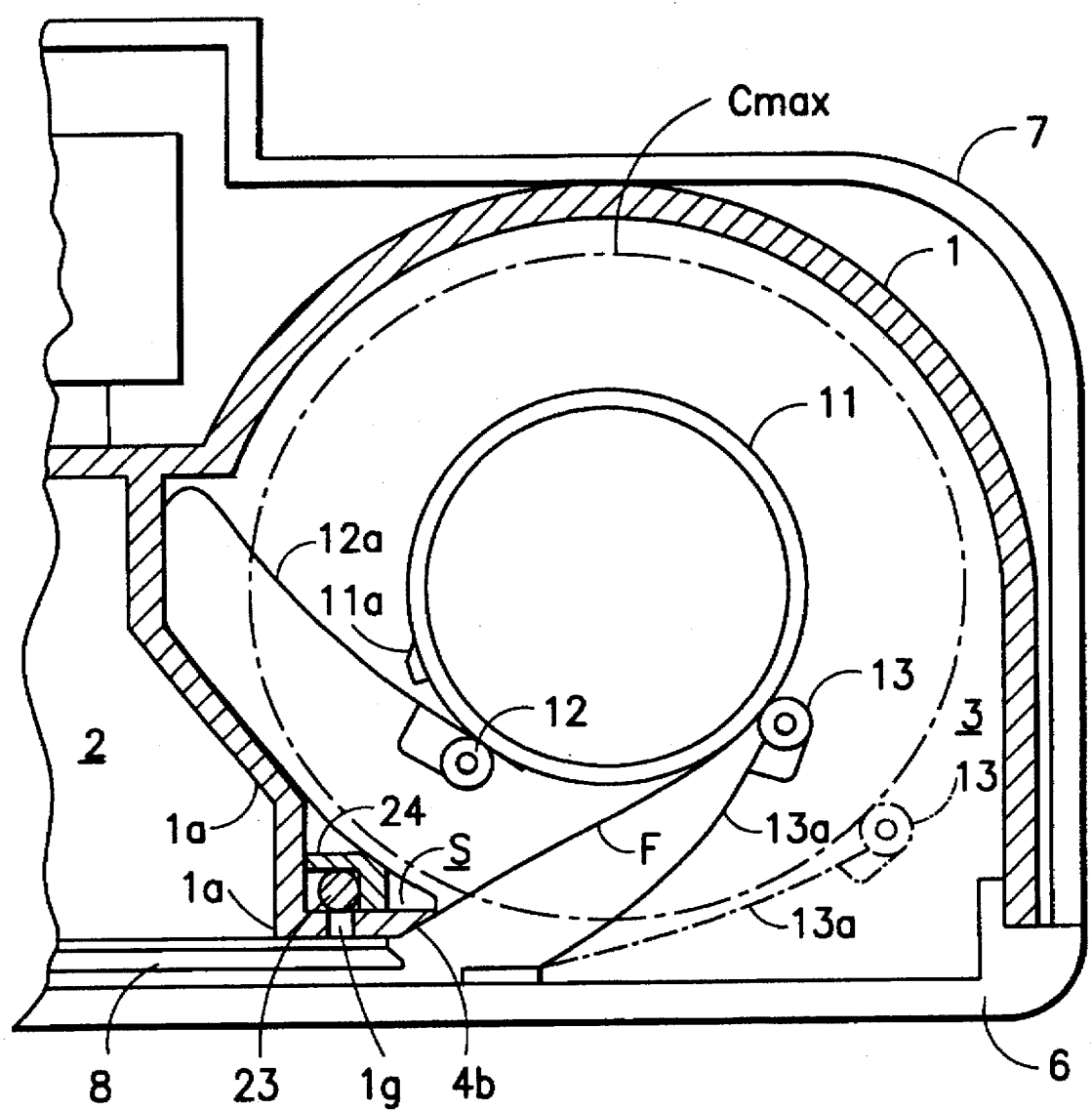
FIG. 1 is a transverse cross section of a portion of a camera according to an embodiment of the present invention.
Figure 2:
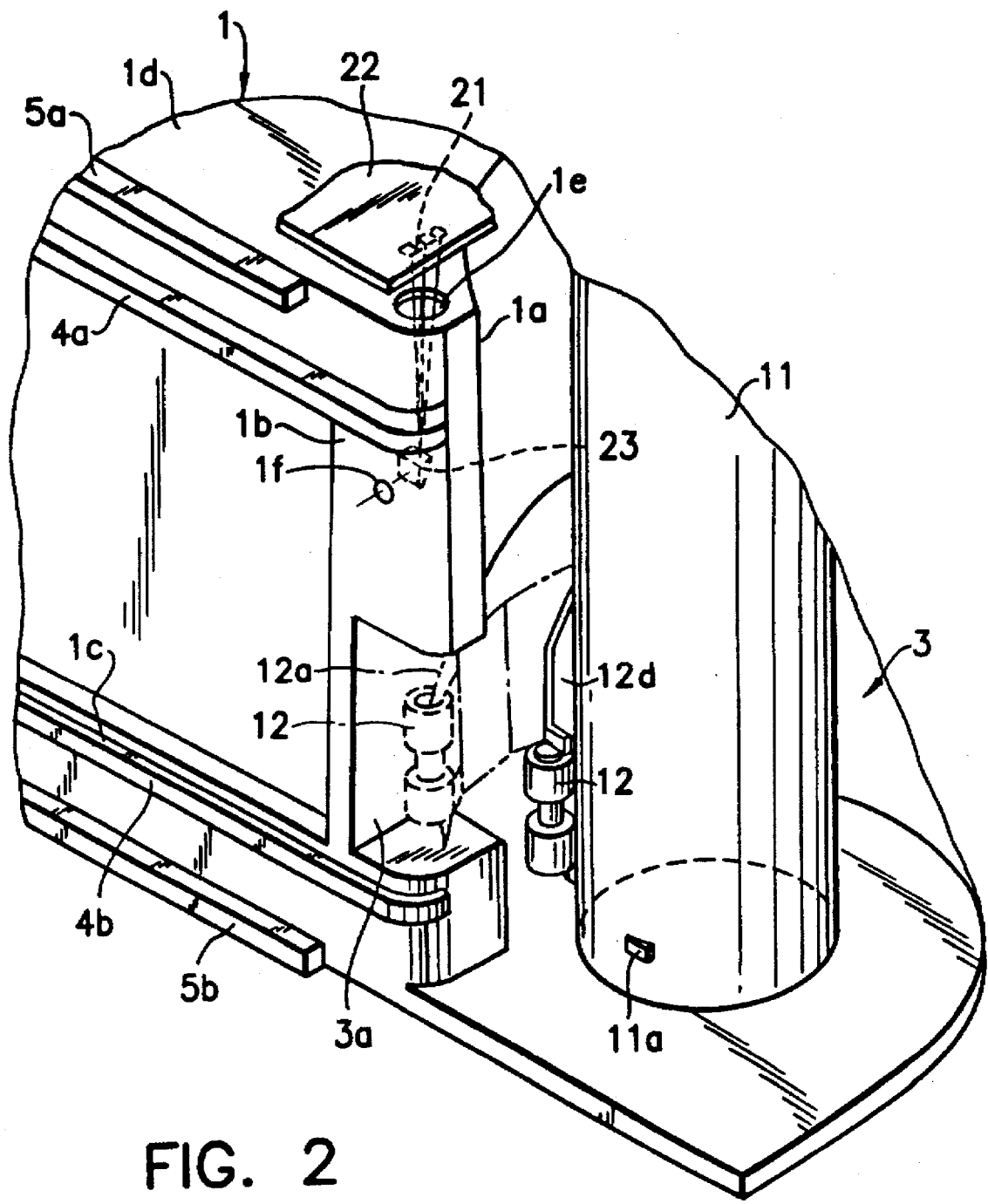
FIG. 2 is a perspective view of a rear portion of a camera body according to the embodiment of the invention in FIG. 1.

Referring to FIGS. 1 and 2, a camera body 1 includes a dark chamber 2 integrally formed therein for guiding light from an object to be photographed, focussed through a photographic lens (not shown), onto a surface of a film F. A spool chamber 3 is separated from dark chamber 2 by a partitioning wall 1a, integrally formed with camera body 1. A back surface 1b of camera body 1 includes an aperture 1c, through which film F is drawn to permit exposure of its photosensitive surface in dark chamber 2. Aperture 1c is flanked on upper and lower sides with inner rails 4a, 4b, respectively. Inner rails 4a and 4b extend about 0.2 mm from back surface 1b into dark chamber 2. A pair of outer rails 5a, 5b are disposed outside inner rails 4a and 4b. Outer rails 5a and 5b extend from back surface 1b into dark chamber 2 a distance greater than the extension of inner rails 4a and 4b into dark chamber 2.

A back cover 6 covers a rear of camera body 1. A front cover 7 covers a front of camera body 1. A pressure plate 8 on back cover 6 is resiliently urged, by conventional means not shown, toward a front of camera body 1. Film F is urged by pressure plate 8 between outer rails 5a, 5b and into contact with inner rails 4a and 4b.

A film spool 11 is centered in spool chamber 3. A film pressing roller 12 is affixed by a leaf spring 12a to partitioning wall 1a in spool chamber 3. Leaf spring 12a urges film pressing roller 12 toward spool 11. A film pressing roller 13 is affixed to back cover 6 by a leaf spring 13a. Leaf spring 13a urges film pressing roller 13 toward spool 11. A sprocket perforation (not shown) in film F is engaged by a boss 11a. As spool 11 is rotated in the counterclockwise direction in the drawing, boss 11a pulls film F about spool 11, whereby continued rotation of spool 11 winds film F on spool 11. The contact of rollers 12 and 13 ensure tight winding of film F on spool 11.

A circle Cmax, shown by a two-dots-dash line in FIG. 1, indicates the maximum diameter of film F wound on spool 11. When the diameter of film F is at or near the maximum circle Cmax, roller 12 is urged into a position, shown by a two-dots-dash line in FIG. 2, in a recess 3a in partitioning wall 1a between dark chamber 2 and spool chamber 3. Roller 13a is also urged outward to a position shown in two-dots-dash line in FIG. 1.

As shown in FIG. 2, a data imprinting device includes a plurality of light emitting elements 21, preferably of light emitting diodes (LEDs), disposed in a line on a substrate 22 in a direction of an optical axis. Substrate 22 is mounted on a top surface 1d of camera body 1. A driving circuit (not illustrated) for light emitting elements 21 is also disposed on substrate 22.

An optical system 23 such as e.g. a prism, is disposed in a substantially triangular space S enclosed by back surface 1b of camera body 1 and film winding circle Cmax. Light is directed downward from light emitting elements 21 through a circular opening 1e in top surface 1d of camera body 1 into triangular space S. The light is refracted by prism 23 at 90 degrees relative to the back of camera body 1. The light from prism 23 is projected through a circular opening 1f in back surface 1b of camera body 1 onto the surface of film F.

One or more of light emitting elements 21 is turned on and off in synchronism with the winding of film. In response to the turning on and off of light emitting elements 21, corresponding data is imprinted on film F. The optical path from light emitting elements 21 to prism 23 is shielded from light leakage by a cover 24. Alternatively, cover 24 may be formed integrally with partitioning wall 1a.

In the prior art, a special rectangular space extends in the direction of the optical axis between the dark chamber and the spool chamber. In contrast, the present invention provides a triangular space S for accommodating the roller 12 between the maximum spool diameter Cmax and the wall of the dark chamber. This substantial difference permits reducing the width of camera, whereby the camera can be smaller and more compact.

Figure 3:
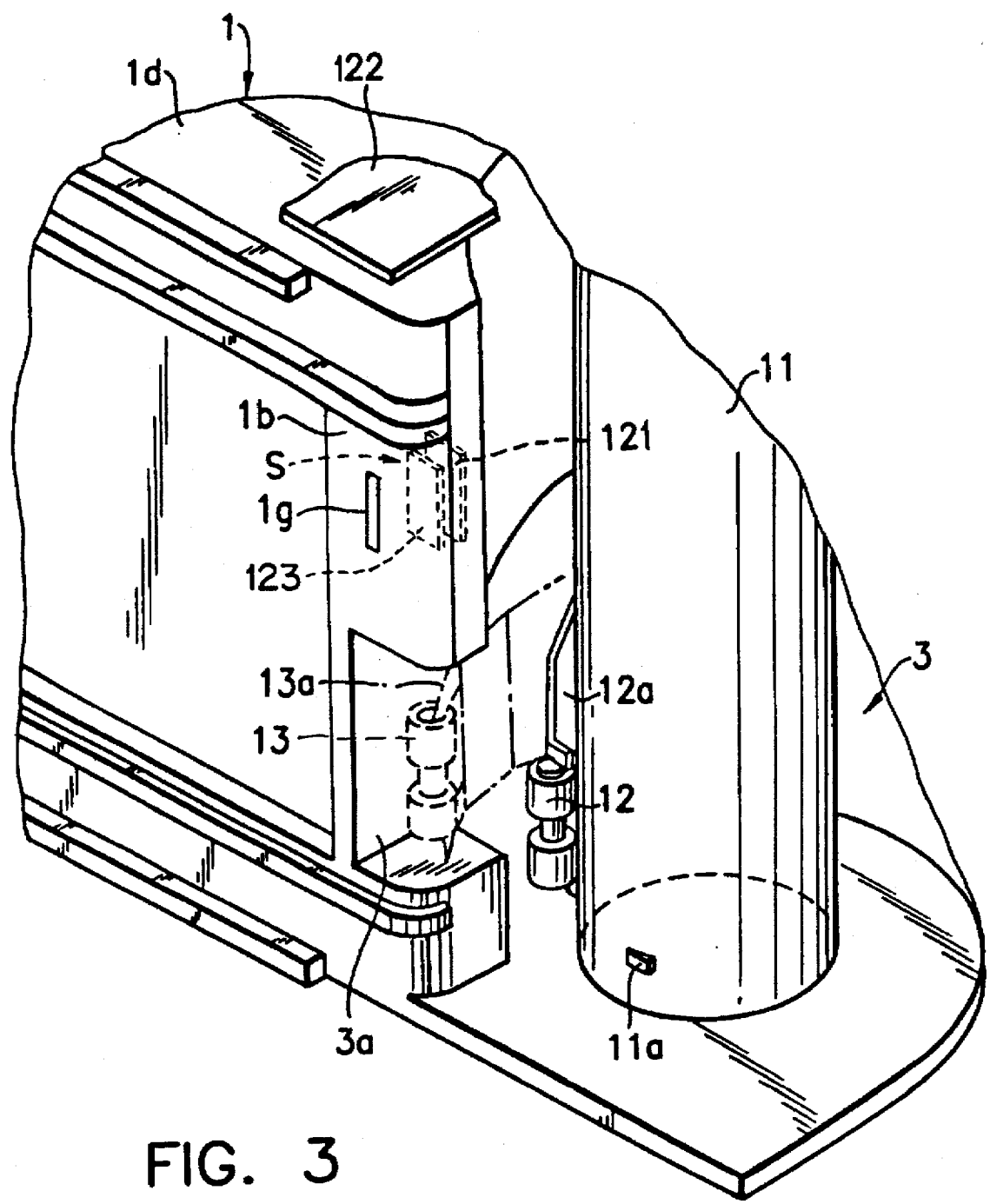
FIG. 3 is perspective view of a rear portion of a camera body according to a further embodiment of the present invention.

According to the foregoing embodiment, only prism 23 of the data imprinting device is disposed in substantially triangular space S. Referring now to the further embodiment of the invention shown in FIG. 3, a plurality of light emitting elements 121 (LEDs) arranged in a vertical line in an upward and downward direction of camera may be disposed in space S. An image forming lens 123 is interposed between light emitting elements 121 and a vertical rectangular slit 1g. Light from light emitting elements 121 is imaged by lens 123 on the surface of film F, which is positioned in the same manner as in the embodiment of FIGS. 1 and 2. A vertical rectangular opening 1g in back surface 1b of camera body 1 permits the light to pass from lens 123 to film F.

A conventional driving circuit (not shown) for driving light emitting elements 121 is disposed on substrate 122.

As discussed above, the substantially triangular space between the maximum film winding circle in the spool chamber and the back surface of the camera body at a side of the spool chamber accommodates at least some elements of the data imprinting device. Accordingly, a special space for the data imprinting device between the spool chamber and the dark chamber is unnecessary, whereby the width of the camera can be reduced.

The foregoing embodiment of the invention provides a single photographic format. In some applications, it is desired to have two or more formats which require changes in the way data is imprinted on film F. For example, it may be desired to provide two modes of operation with different widths of film F being used for the two formats. In one application, it is desired to provide selectable formats wherein either a full width photograph or a reduced width (panorama) photograph may be produced. To accomplish this, the lens is moved with respect to film F either to fill the entire width of film F (full width mode), or to fill only a center portion of the width of film F (panorama mode) This difference in mode has implications for the data imprinting device. For example, the height and width of the imprinted characters preferably are changed to values suitable for each particular mode.

Figure 4:
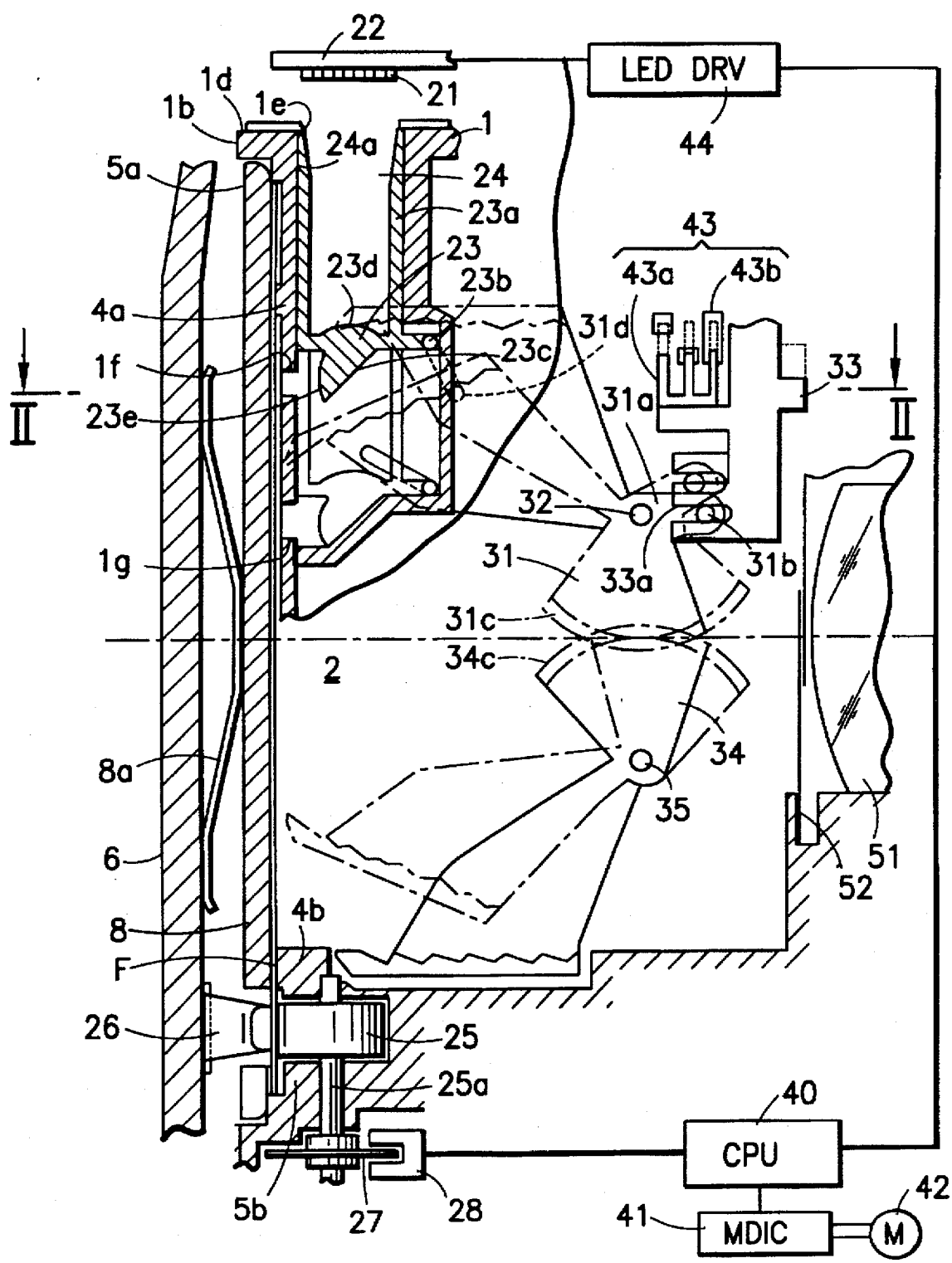
FIG. 4 is a longitudinal cross section of a camera according to a still further embodiment of the invention.
Figure 5:
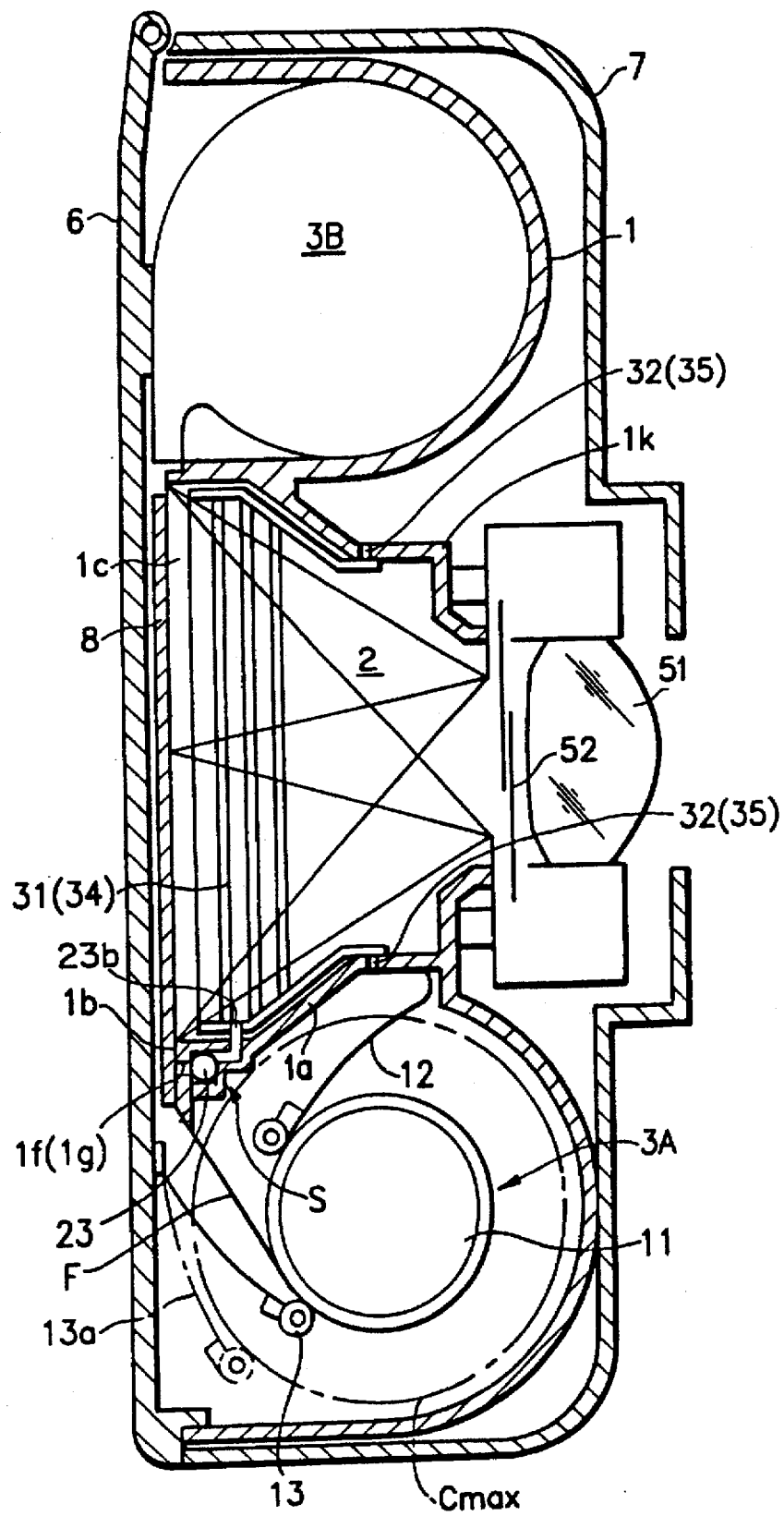
FIG. 5 is a transverse cross section of the camera of FIG. 4.

Referring now to FIGS. 4 and 5, an upper screen size changing frame 31 is attached rotatably by a shaft 32 to partitioning walls 1a and 1k. A screen change operating portion 33 is operated by an external operating member (not illustrated) outside camera body 1. An ear portion 31a protrudes from upper screen size changing frame 31. A pin 31b, attached to ear portion 31a, engages a coupling recess 33a of screen change operating portion 33. Actuation of screen change operating portion 33 is effective to rotate upper screen size changing frame 31 between a normal position, shown in solid line, and an actuated position, shown in two-dots-dash line.

A lower screen size changing frame 34 is attached rotatably to partitioning walls 1a and 1k by a shaft 35, in a manner similar to the attachment of upper screen size changing frame 31. Upper and lower screen size changing flames 31 and 34 have sectors gear 31c and 34c respectively. Sector gears 31c and 34c are in engagement with each other. When upper screen size changing frame 31 is in its normal (solid-line) position, engagement between sector gears 31c and 34c maintain lower screen size changing frame 34 in its normal (solid-line) position. In these normal positions, photographs are taken in their normal size. When upper screen size changing frame 31 is rotated to its actuated (two-dots-dash line) position, lower screen size changing frame 34 is also rotated to its actuated (two-dots-dash line) position. In the actuated positions, photographs are taken in panorama (wide-angle) size.

Figure 6:
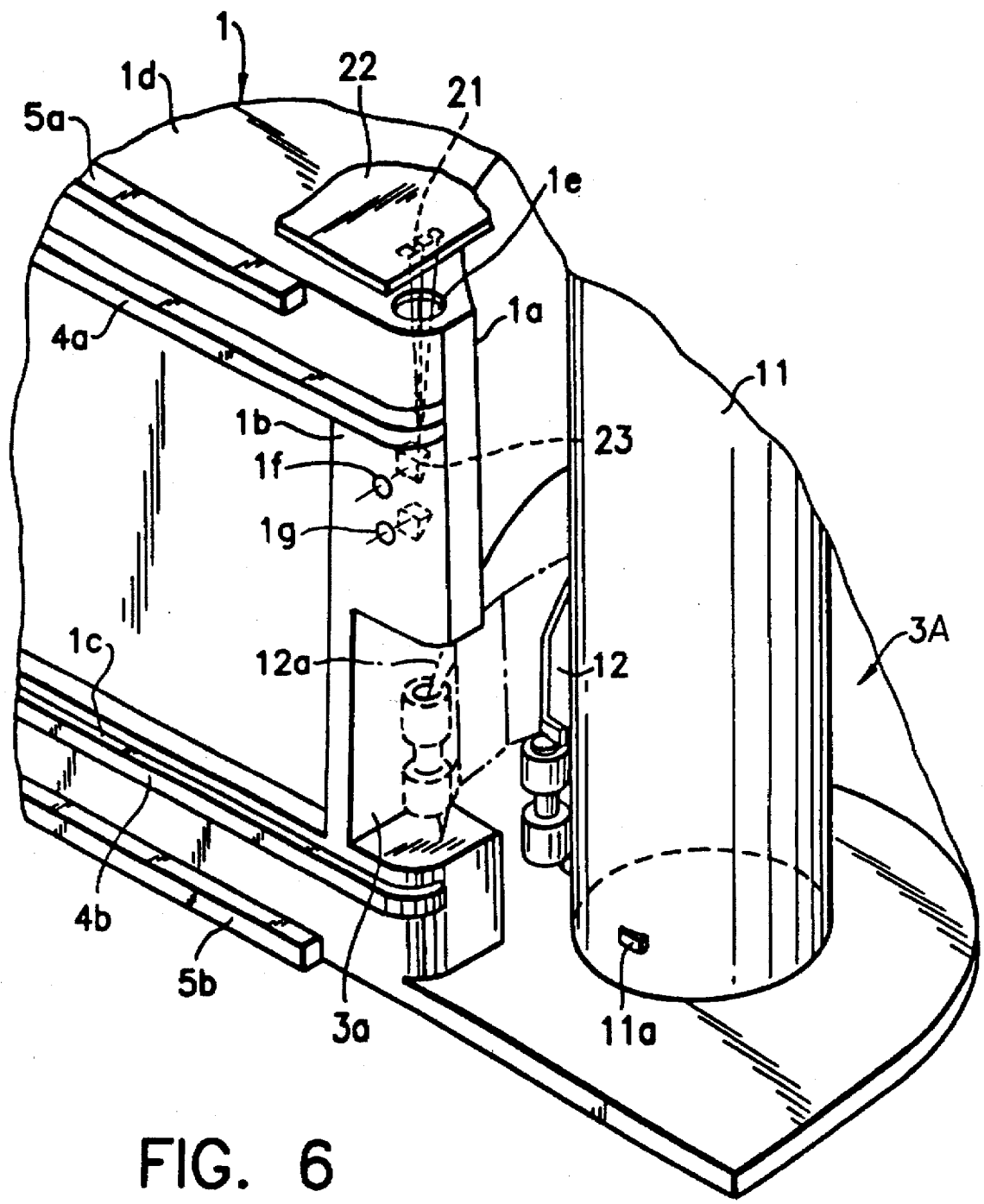
FIG. 6 is a perspective view of a rear portion of a camera body according to the embodiment of the invention in FIG. 5.

Referring to FIGS. 4, 5 and 6, a light element chamber 24 for data imprinting device is formed in space S of camera body 1. A guide cylinder 23a for optical system 23, illustrated as a prism 23, is slidably fitted into an upper guide 24a of light element chamber 24. Prism 23 includes a lever 23b protruding into dark chamber 2. The top of lever 23b passes through partitioning wall 1a into a long opening 31d in upper screen size changing frame 31. When upper screen size changing frame 31 is rotated between its solid line and its two-dots-dash line positions, prism 23 is moved up and down between a first position, shown in solid line, and a second position, shown in two-dots-dash line.

Light from light emitting elements 21 enters through an opening 1e in top surface 1d of camera body 1 into light chamber 24, and then is bent by prism 23 90 degrees toward the rear plane of the camera.

An entry lens 23d, integrally formed with prism 23, permits entry thereinto of light from light emitting element 22. A totally reflecting plane 23c on prism 23 reflects light impinging on it from entry lens 23d, and thereby redirects the light at right angles to its original direction through an exit lens 23e.

When components are in their solid-line positions, the light passes from exit lens 23e through opening If in camera body back surface 1b to impinge on film F. When components are in their two-dots-dash line positions, light from exit lens 23e passes through an opening 1g in camera body back surface 1b to impinge on film in an appropriate position for the panorama photograph being exposed in this condition.

Data may be imprinted on film F using, for instance, characters formed in a 9×9 matrix. As best shown in FIG. 4, light emitting elements 21 consist of 9 LEDs arranged in a linear array. The 9 LEDs can be turned on and off independently of each other. Light emitting elements 21 are actuated in a suitable pattern at nine points in time corresponding to nine successive positions of film F as it passes opening If or 1g. This is sufficient to produce a 9×9 array which can represent, for example, a desired alphabetic or numeric character. A suitable time after one alphabetic or numeric character has been exposed on film F, a second alphabetic or numeric character can be exposed during continued movement of film F, and so on until a complete desired character set has been exposed.

Referring to FIG. 4, a roller 25 contacts an inner surface of film F. A spring 26 contacts an outer surface of film F aligned with the position contacted by roller 25. Frictional contact between roller 25 and the surface of fill F rotates roller 25 in step with the movement of film F. A shaft 25a is affixed to rotate with roller 25. A slit wheel 27 is affixed at a lower end of shaft 25a of roller 25. A conventional photo interrupter 28 encircles the edge of slit wheel 27. Photo interrupter 28, as is conventional, includes a light source in one of its arms, and a photo detector in the other of its arms. Each time a slit in slit wheel 27 passes between the light source and the photo detector, the photo detector produces an output pulse signal synchronously with the rotation of slit wheel 27. This output pulse signal indicates the length of film passing roller 25.

The output pulse signal from photo interrupter 28 is applied as a feedback signal to a control device 40 having, for example, a CPU, ROM, RAM and peripherals. For purposes of the present description, a CPU in control device 40 controls a film advance motor driver 41 which, in turn, drives a film advance drive motor 42. A screen size detecting switch 43 is controlled by the position of screen changing operating portion 33. A brush 43a, movable with screen changing operating portion 33, contacts a stationary portion 43b. Contact between the movable and stationary portions of screen size detecting switch 43 produces an electrical signal which is applied to control device 40 to inform it that panorama mode is selected. Upon receiving this signal, control device 40 adjusts its signals to the data imprinting controller to control the positioning and timing of the imprinted data corresponding to that required in panorama mode. Conversely, when the stationary and movable portions of screen size detecting switch 43 are out of contact, this condition, communicated to control device 40, results in control of imprinting corresponding to that required in full size mode.

Signals produced by control device 40 are applied to a light emitting element driver 44. Light emitting element driver 44 produces the appropriate sequence of energizing signals for the 9 LEDs of light emitting element 21. The timing of energizing signals applied to light emitting element 21 is controlled according to whether operation is in full size or panorama mode. That is, for a fixed film advance speed, the time between energizing pulses is shorter for panorama than it is for normal mode. This timing is determined in control device 40 in response to the control signal from screen size detecting switch.

In addition to the above elements, a conventional lens 51 and shutter 52 are provided.

According to the above structure, when the full size mode is selected by actuation of screen changing operating portion 33, upper and lower screen size changing frames 31 and 34 are disposed in the normal positions shown in solid line. This establishes the full size mode with prism 23 located at its first position shown in solid line. In this condition, light from light emitting element 21 passes through prism 23, and is focused through opening if onto the surface of film F.

Figure 7:
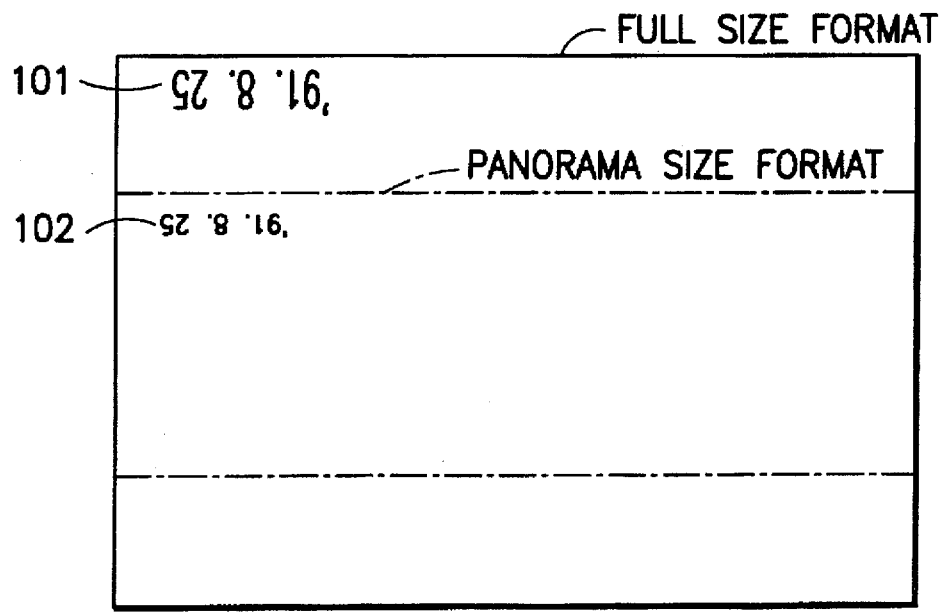
FIG. 7 is a view of a film illustrating the fields covered by full size mode and panorama mode.

Referring now to FIG. 7, in the full size mode discussed in the preceding paragraph, the sequence of light pulses from light emitting element 21 is imaged as data 101 along the upper edge of the film.

Returning now to FIG. 4, when the panorama size mode is selected by operation of screen changing operating portion 33, upper and lower screen size changing frames 31 and 34 are move to their second positions shown in two-dots-dash line, with prism 23 at its second position shown in two-dots-dash line. In the panorama mode, light from light emitting devices 21 is focussed by prism 23 through opening 1g onto the surface of film F.

Referring again to FIG. 7, the data in panorama mode produces panorama-mode data 102 spaced inward from the position of normal-mode data 101.

Figure 8A:
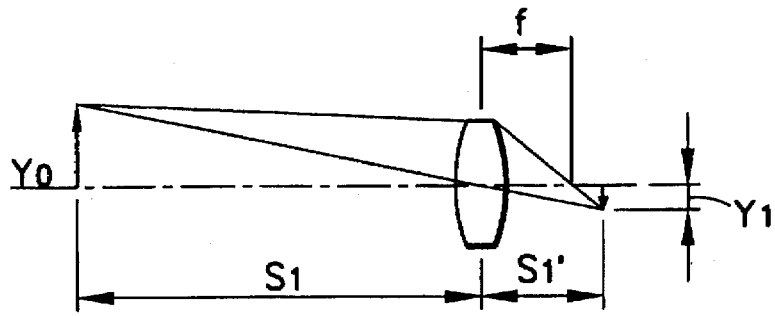
FIGS. 8a and 8b are schematic diagrams showing the optical paths in full size and panorama modes, respectively.
Figure 8B:
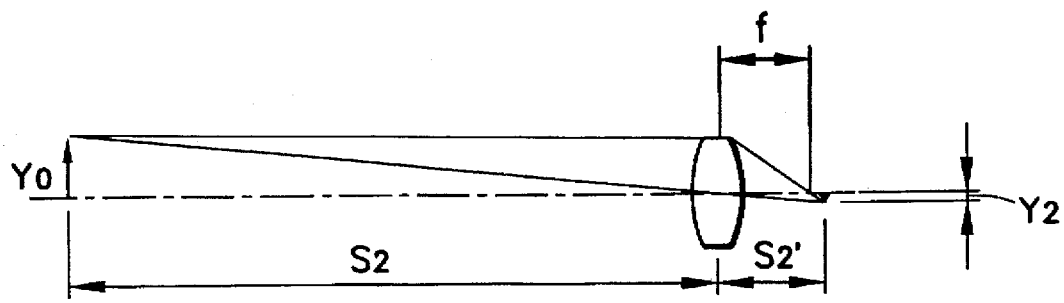

Referring to FIGS. 8a and 8b, the optical relationships for producing the imprinted data, described in the foregoing, is shown. The height $y_0$, at the left of these figures, is the height of light emitting elements 21, which is constant. In the full size mode, shown in FIG. 8a, the ratio of distances S1 and S1', to the lens center of prism 23 produces a focal length f which results in an imprinted image size $y_1$, shown at the right of FIG. 8a. In contrast, in panorama mode the ratio of distances S2 and S2' to the lens center of prism 23, produces a longer focal length f, and a smaller imprinted image size $y_2$.

At full size or panorama size, the relationships between the lengths s1, s2 of light emitting devices 21 and a lens center of prism 23 and the lengths s1', s2' of the lens center of prism 23 and the image plane respectively, produce a relationship wherein s1<s2 and s1'≈s2'. The height $y_0$ of light emitting devices 21 (the length of 9 LEDs) on the axis through a lens center is constant, and the height $y_1$ of the image at the full size is bigger than the height $y_2$ of image at the panorama size. Therefore, the enlargement at the full size is greater than it is at the panorama size.

It will be noticed in FIGS. 8a and 8b, that the focal length f and the focal distances S1' and S2' are quite similar, but are not quite equal. Thus, if sharp focus is produced at the panorama size, then the defocus produced by the distance (s2'-s1') occurs at the full size. Therefore, it is necessary to arrange the specification of a lens, light emitting devices and so on to prevent this problem.

Similarly, if a sharp focus is produced at the full size, then a defocus is produced at the panorama size. A suitable compromise is obtained by choosing a single lens with a compromise focal length that which produces a focus point above the lens in full size mode, and at the rear of the lens at panorama size. When properly chose, this arrangement leaves a small, but acceptable, amount of defocus at both sizes so that a satisfactory equality of sharpness can be obtained in both operating modes.

The period between energizations of light emitting devices 21 is controlled by control device 40 (FIG. 4) to compensate for the differences in image sizes so that the ratio of the height to the width of imaged characters is the same in both modes, with both height and width of characters smaller in panorama mode. The period between energizations in the panorama mode thus is preferably shorter than it is at the full size. To control the period of flash, the motion of the film is detected according to the period of the pulse signal from photo interrupter 28. The period of the flash is selected corresponding the advance of film F.

Figure 9:
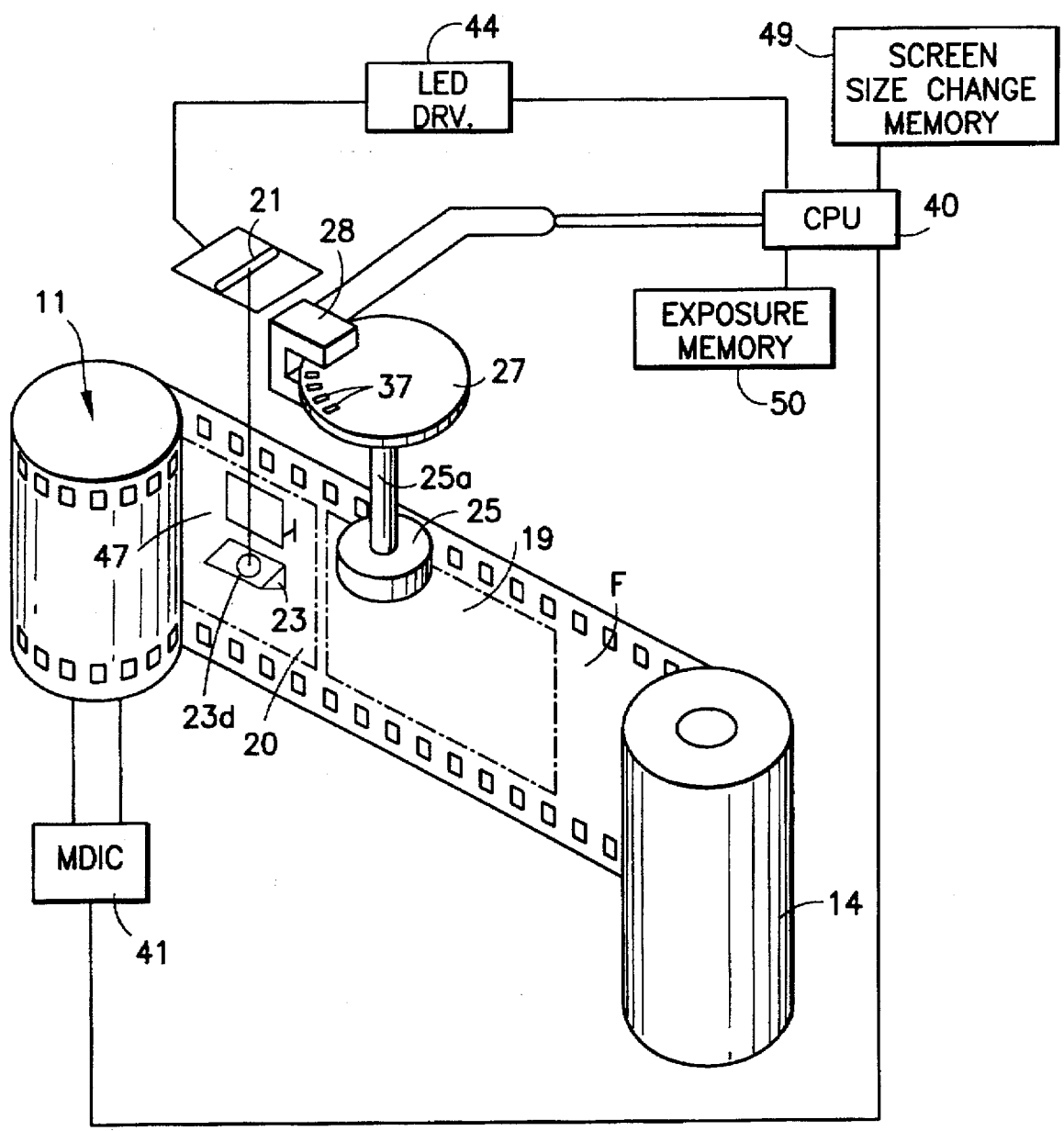
FIG. 9 is a simplified schematic perspective view of a film drive, and feedback and control system according to an embodiment of the invention.

Referring FIG. 9, an end of film F is held in a film cartridge 14. The other end of film F is wound on spool 11. Film advance drive motor 42 (not illustrated in FIG. 9) is contained in spool 11.

The position of an aperture screen 19, representing the area of film F upon which the next photograph will be exposed, is shown on a two-dots-dash line in the center of film F. The position of a previous screen 20 is shown as a two-dots-dash line partly wound on spool 11.

Slit wheel 27 includes a plurality of radial slits 37 in its perimeter. Photo interrupter 28 applies a pulse signal to control device 40 each time one of radial slits 37 passes between its arms.

After a picture is taken, light emitting elements 21, located above previous screen 20 of film F, are actuated in the appropriate pattern and sequence by light emitting element driver 44.

As film F is advanced following the taking of a picture, the light from light emitting elements 21 passes through optical system 23 to impinge on a fixed position on previous screen 20 as it is advanced past the fixed position. The pattern and timing of energizing signals fed to light emitting elements from light emitting element driver 44 imprints data on film F in the conventional shapes characteristic of dot matrix representation.

A screen size changing memory 49 contains the information required by control device 40 to control the advance of film F, the movement of lens 51 and shutter 52 and the control of light emitting elements in the two modes of operation (full size and panorama). Screen size changing memory 49 communicates the required information to control device 40 according to the mode selected. In response to this information, control device 40 produces a control signal connected to light emitting element driver 44. The control signal includes information about which of the 9 LEDs in light emitting device 21 are energized at any time, and controls the timing of such energization.

An exposure system memory 50, containing information regarding control of shutter 52, applies its information to control device 40. Screen size detecting switch 43 (FIG. 4) provides the input to control device 40 which permits it to determine which information it will employ.

Figure 10:
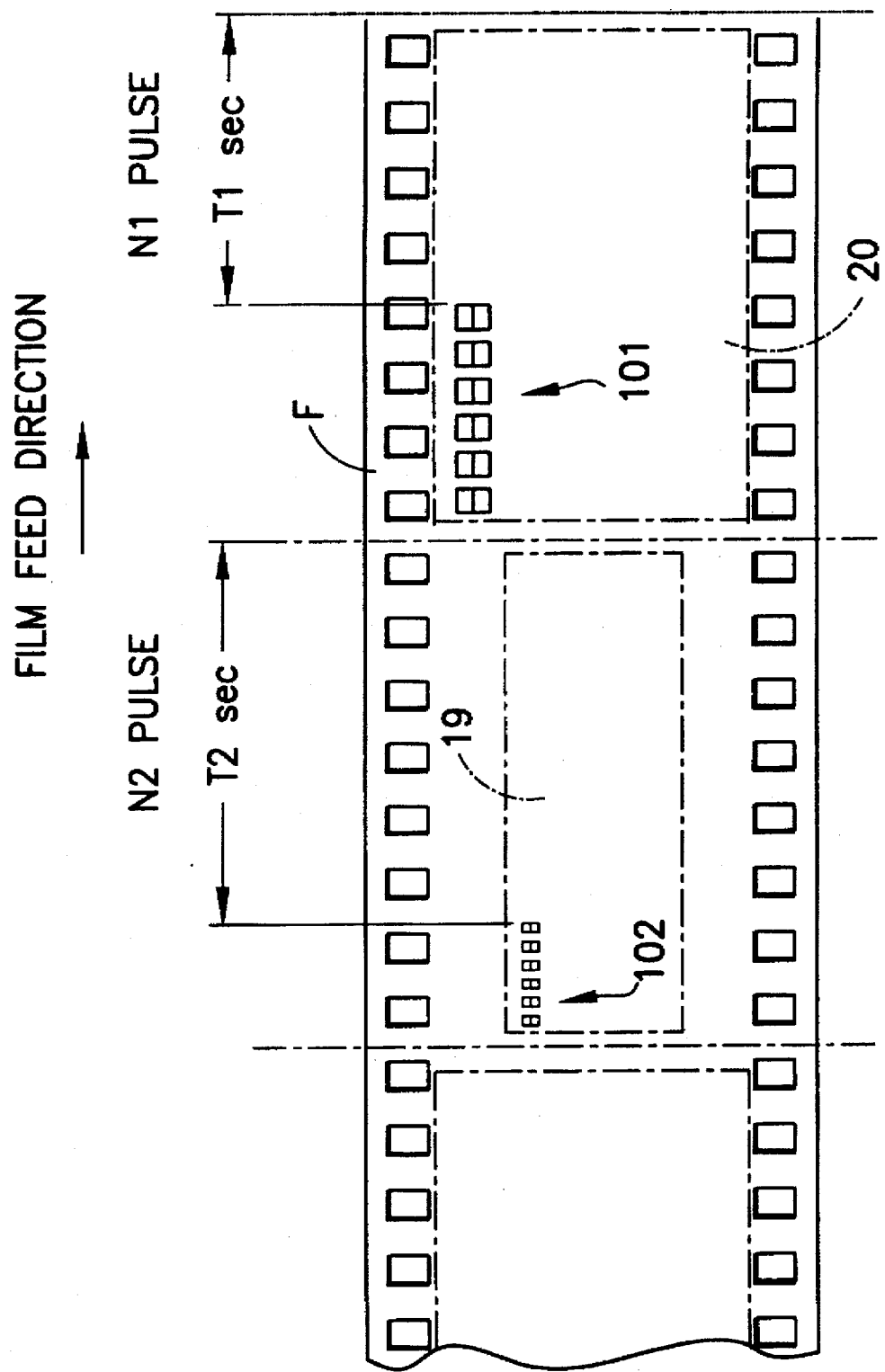
FIG. 10 is a closeup view of a film to which reference will be made in describing the manner in which the imprinting of data is controlled.

Referring now to FIG. 10, more detail is shown about the technique for imprinting dot matrix characters at the edge of film F. As also shown in FIG. 7, the size of data characters imprinted is switched by actuation of screen change operating portion 33 to appropriate sizes for the screen size selected. In addition to the size difference, a difference also exists in the point on film F where data imprinting begins. That is, panorama-mode data 102 begins in aperture screen 19 at a point substantially to the left of corresponding normal-mode data 101 data.

For normal-mode data 101, a delay period of $T_1$ seconds is imposed, during which film F is advanced at a constant speed, before the start of imprinting the first character of imprinting data. Thereafter, additional characters are produced with a timing effective to complete imprinting of normal-mode data 101 before the end of film advance. In contrast, for panorama-mode data 102, a delay period of $T_2$ seconds is imposed before the first character of imprinting data is begun. The delay period $T_2$ is substantially longer than the delay period $T_1$. Accordingly, the rate at which characters are produced for panorama-mode data 102 must be more rapid than for normal-mode data 101, in order that the data imprinting can be completed before the end of aperture screen 19 moves past the imprinting location.

Referring now to FIGS. 11a through 11d, with prism 23 in its normal position, if all 9 LEDs in light emitting element 21 are energized at each of the nine positions required to create a character, the full pattern in FIG. 11a would result. As shown in FIG. 11b, selective energization of the nine LEDs as film F moves therepast results in the creation of desired patterns such as, for example, numerals "8". FIG. 11c shows the result that would be obtained if panorama mode used the same timing as normal mode shown in FIG.

11b. It is clear that the imprinted characters are distorted due to their lower height, without proportionate reduction in width. FIG. 11d shows the desired result in which the start of imprinting of panorama-mode data is delayed, and the generation of characters is speeded up. It will be noted that the height and width of the panorama-mode characters in FIG. 11d are in the correct proportion. In the particular embodiment of the invention illustrated in FIGS. 11a through 11d, the rate of generating panorama-mode data is twice the rate of generating normal-mode data, thus resulting in a 50-percent reduction in character width.

Figure 12B:
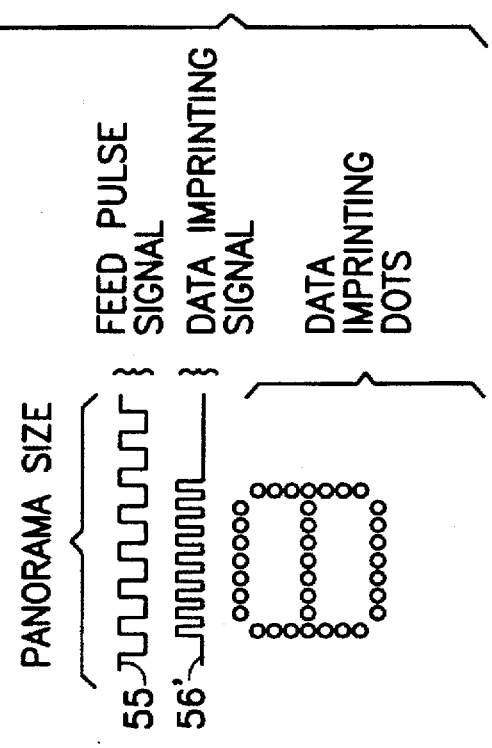
FIGS. 12a and 12b are figures illustrating the relationships between feed pulse signals, and their data imprinting signals in full size and panorama modes, respectively.
Figure 12A:
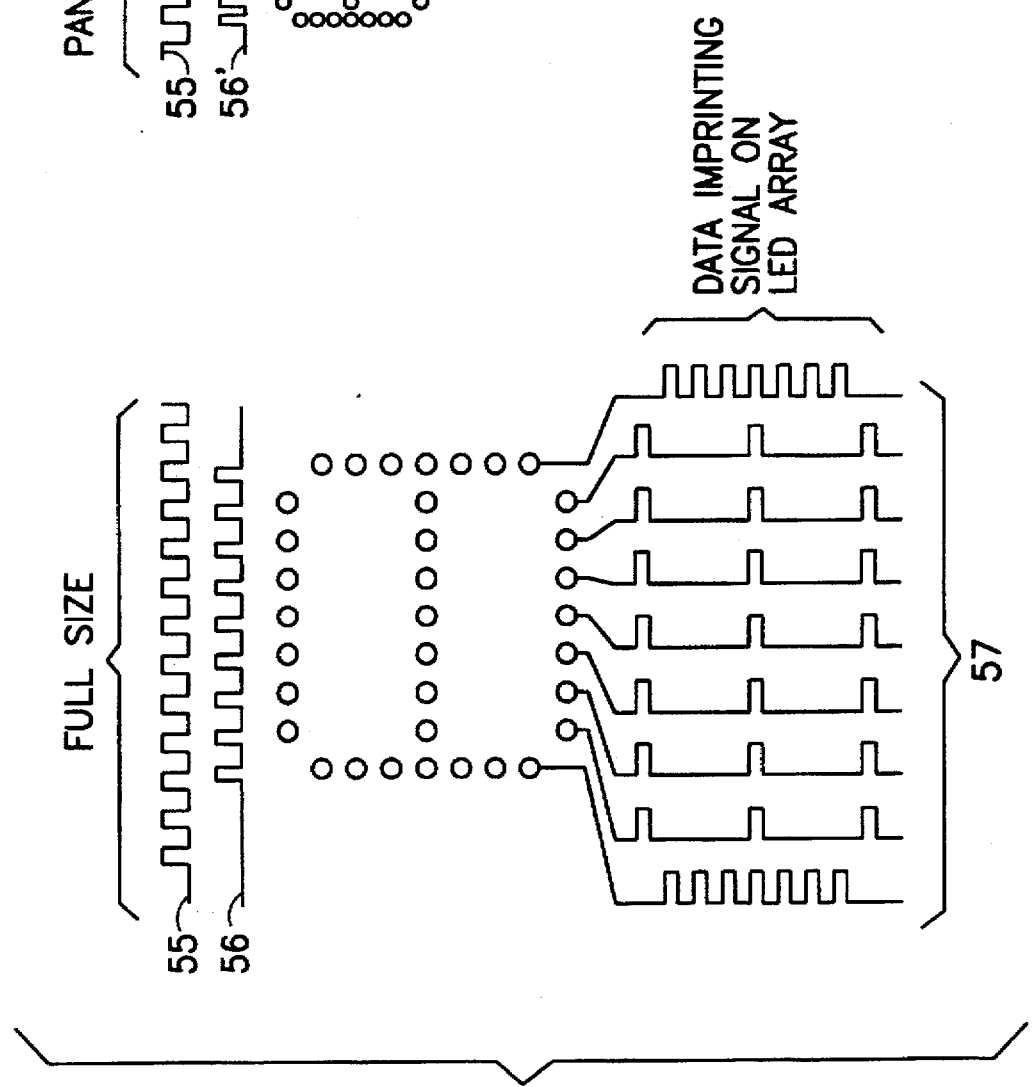

Referring now to FIG. 12a, the upper portion shows a clock signal 55, and a row enable signal 56, derived therefrom, for enabling energization of one or more LEDs in light emitting element 21 for imprinting of normal-mode data. At the bottom of FIG. 12a, is shown the energizing pulses 57 for individual ones of the 9 LEDs during the production of a dot-matrix "8". FIG. 12b shows the same clock signal 55, in relation to a row enable signal 56' for the production of imprinting data in panorama mode. It will be noted that, whereas row enable signal 56, for normal mode data, occurs once per cycle of clock signal 55, the row enable signal 56', for panorama mode, occurs twice per cycle of clock signal 55. In this manner, the width of the imprinted data in panorama mode is half the width of imprinted data in normal mode. Although not shown in FIG. 12b, energizing pulses 57', corresponding to energizing pulses 57 of FIG. 12a, are produced to energize individual ones of the LEDs, but at twice the rate as is the case for normal mode.

FIGS. 13–14 and 16–17 define the steps, shown in flowchart fashion, for the control of picture taking, and data imprinting, according to two embodiments of the invention.

Figure 13:
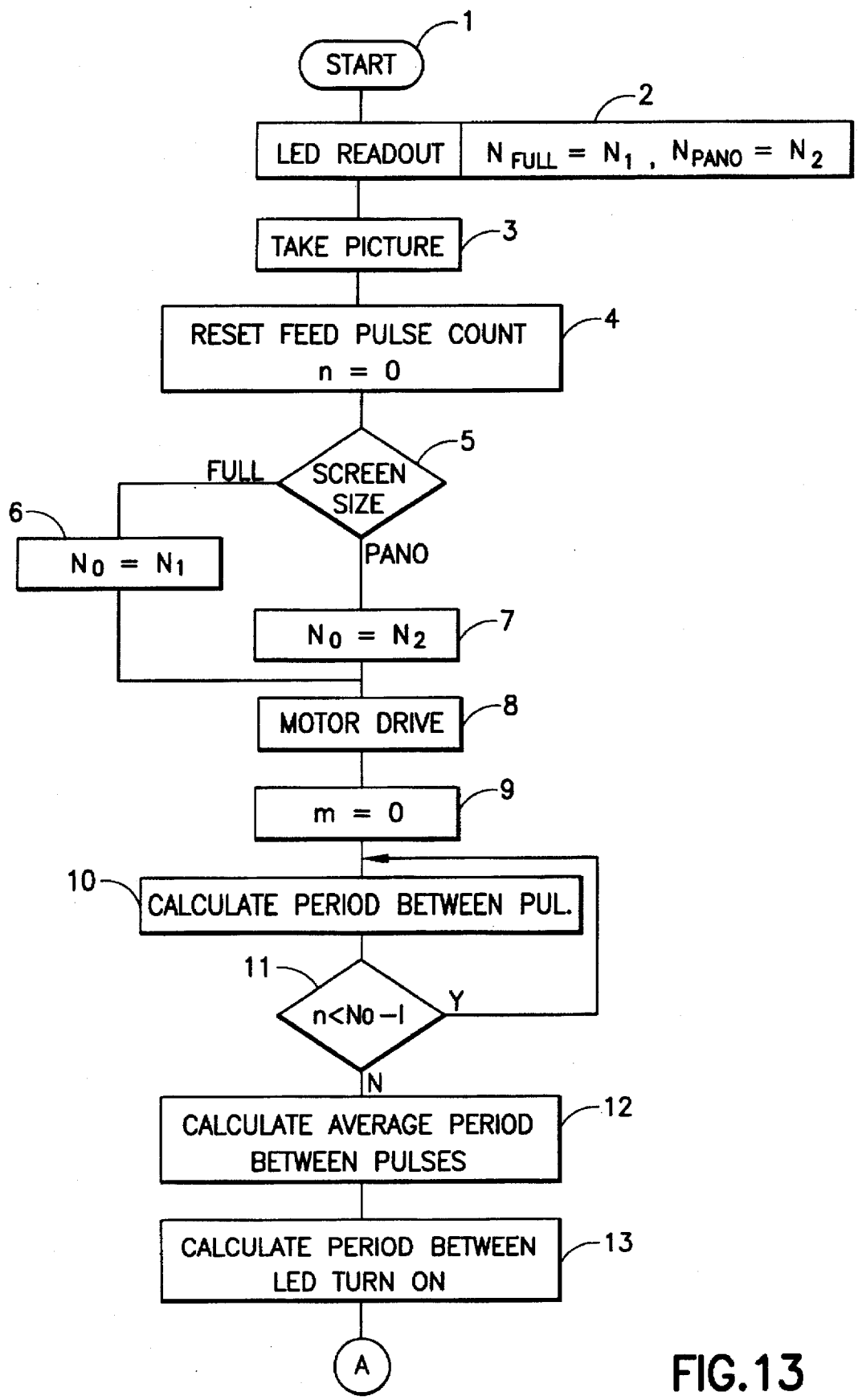
FIG. 13 is a flow chart describing a portion of the flow of operations according to one operating system of the invention.
Figure 14:
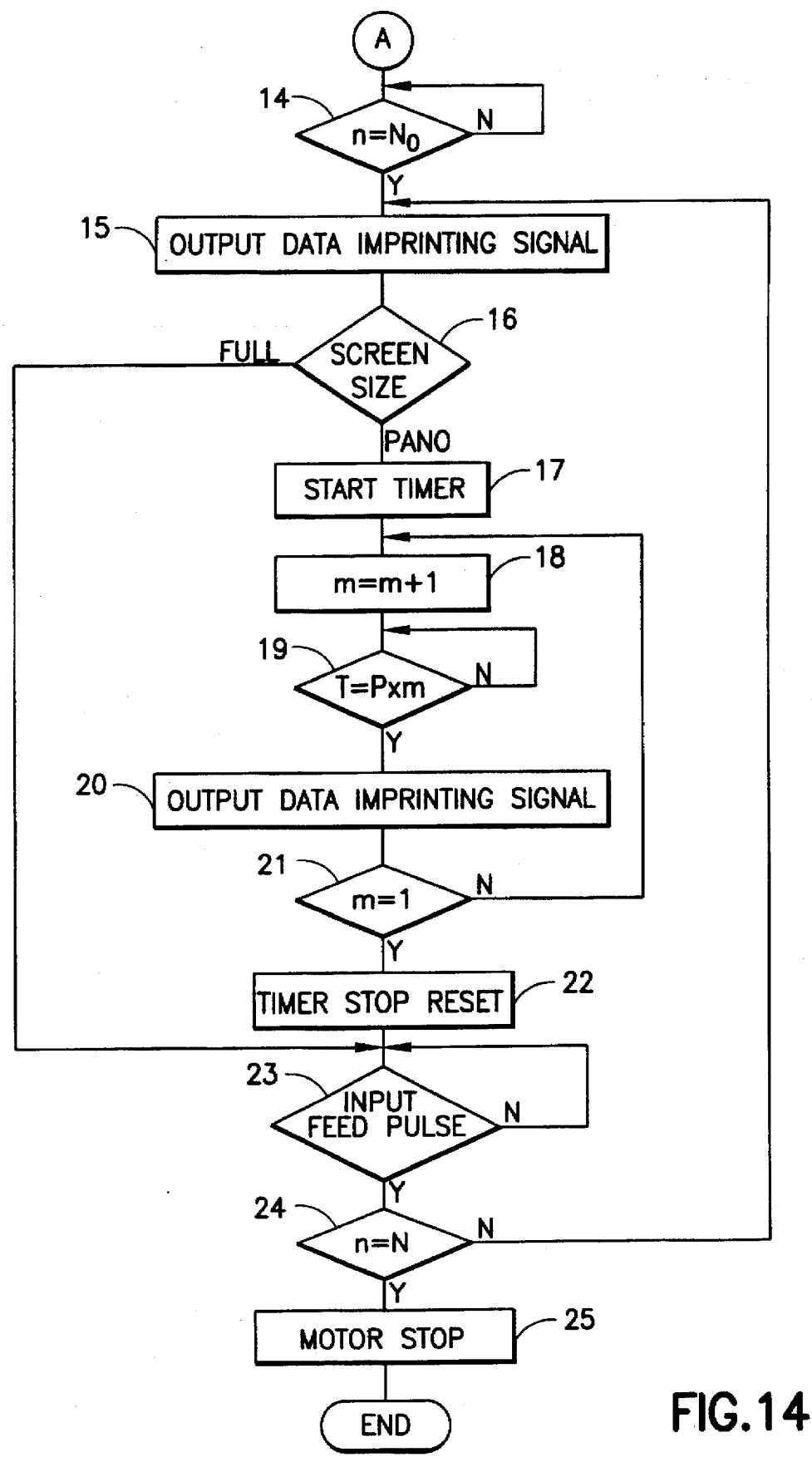
FIG. 14 is the flow chart describing the remainder of the flow of operations following the flow chart in FIG. 13.

Referring to FIG. 13, step 1 starts the process of taking a picture.

In step 2, an LED emission start count is selected to set the time at which imprinting data is read out for imprinting in a predetermined position on film F. The number of LED emission start pulses is N1 for full size and N2 for panorama size.

In step 3, a shutter is opened, and a picture is taken. In step 4, the feeding pulse signal is reset to 0. In step 5, the screen size, full size or panorama size, is detected.

When the size detected is the full size, step 6 sets N0=N1. When the size detected is the panorama size, step 7 sets N0=N2. In step 8, the film advance drive motor is energized, thereby driving the film forward.

Step 9 sets m=0, where m is the number of imprinting data pulses 56 between the clock pulse signals 55. In the case of normal size, m is set to 0. That is, the number of imprinting data pulses 56 is equal to the number of clock pulse signals 55. When panorama size is selected, m=1. That is, for each clock pulse, there are two imprinting data pulses 56, according to the description of FIGS. 12a and 12b.

In step 10, the period between feeding pulse signals is measured. In step 11, if the number n of feeding pulse signals is smaller than N0−1, go back to step 10. Or if the number n of feeding pulse signals is equal to or greater than N0−1, the average of the period is obtained in step 12.

In step 13, the period P to turn on LEDS between one feeding pulse signal and the next feeding pulse signal is calculated. In this case, since the number of data imprinting is one, the period P is obtained from the average period between feeding pulse signals divided by 2.

In step 14, it is determined whether or not the number n of feeding pulse signals is equal to N0. If the number n of feeding pulse signals is equal to N0, the data imprinting signals are output and the LEDs are turned on in step 15.

In step 16, it is determined whether or not the screen size is full size or panorama size. If the screen size is full size, go to step 23. If the screensize is panorama size, go to step 17 actuate the timer.

In step 18, let m=m+1. In step 19, it is determined whether or not the count of the timer is equal to the period P multiplied by m. If the count of the timer is equal to the period P multiplied by m, the data imprinting signals are output. The LEDs are mined on in step 20.

In step 21, it is determined whether or not m=1. If m=1, the timer is stopped, and then is reset in step 22. In step 23, it is determined whether or not the feeding pulse signals have been input. If the feeding pulse signals have been input, step 24 determines whether or not the number n of feeding pulse signals is equal to N. If the number n of feeding pulse signals is equal to N, step 25 stops the feeding motor and finishes imprinting data.

If the number n of feeding pulse signals is not equal to N in step 24, go back to step 15. The value N equals the number of pulses required to feed one frame of film F.

Imprinting of data does not continue until n=N. Instead, imprinting of data is completed at N−k. When n=N, the film advance drive motor is stopped in step 25.

As above mentioned, feeding pulse signal 55 is employed to advance the film. For full size photography, pulses of data imprinting signal 56 are generated one per feeding pulse signal 55. As a consequence of this relationship, data is imprinted synchronously with the advance of the film. For panorama photography, pulses of data imprinting signal 56' are generated twice per feeding pulse signal 55. Thus, a synchronous relationship applies to data imprinting in this mode as well. This makes possible the use of a single feeding pulse signal 55 for both modes of photography and data imprinting. The technique makes it possible to imprint detailed data.

The present technique reduces the number of slits required in slit wheel 27 (FIG. 9), since multiple data imprinting signals are output for each feeding pulse signal. This makes it possible to reduce the size of the encoder, thereby reducing the size of the camera.

Also, since the period of data imprinting signal 56/56' is equal to an integral fraction of feeding pulse signal 55, less feeding pulse signals 55 are required to imprint data corresponding to the screen size.

Figure 15:
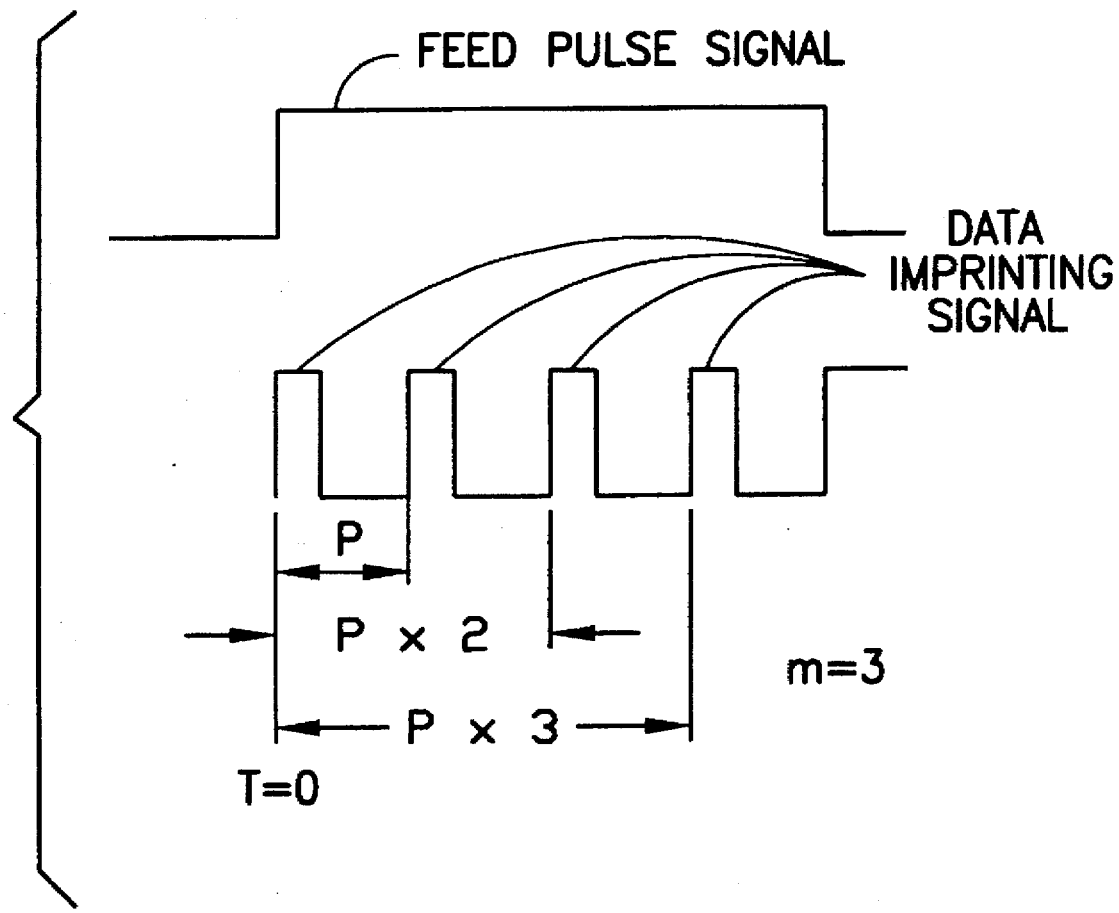
FIG. 15 is a curve showing the relationship between the feed pulse signal and the data imprinting signal.

Referring to FIG. 15, four data imprinting signal are output corresponding to one feeding pulse signal. In this case, let m=3 in step 21.

Figure 16:
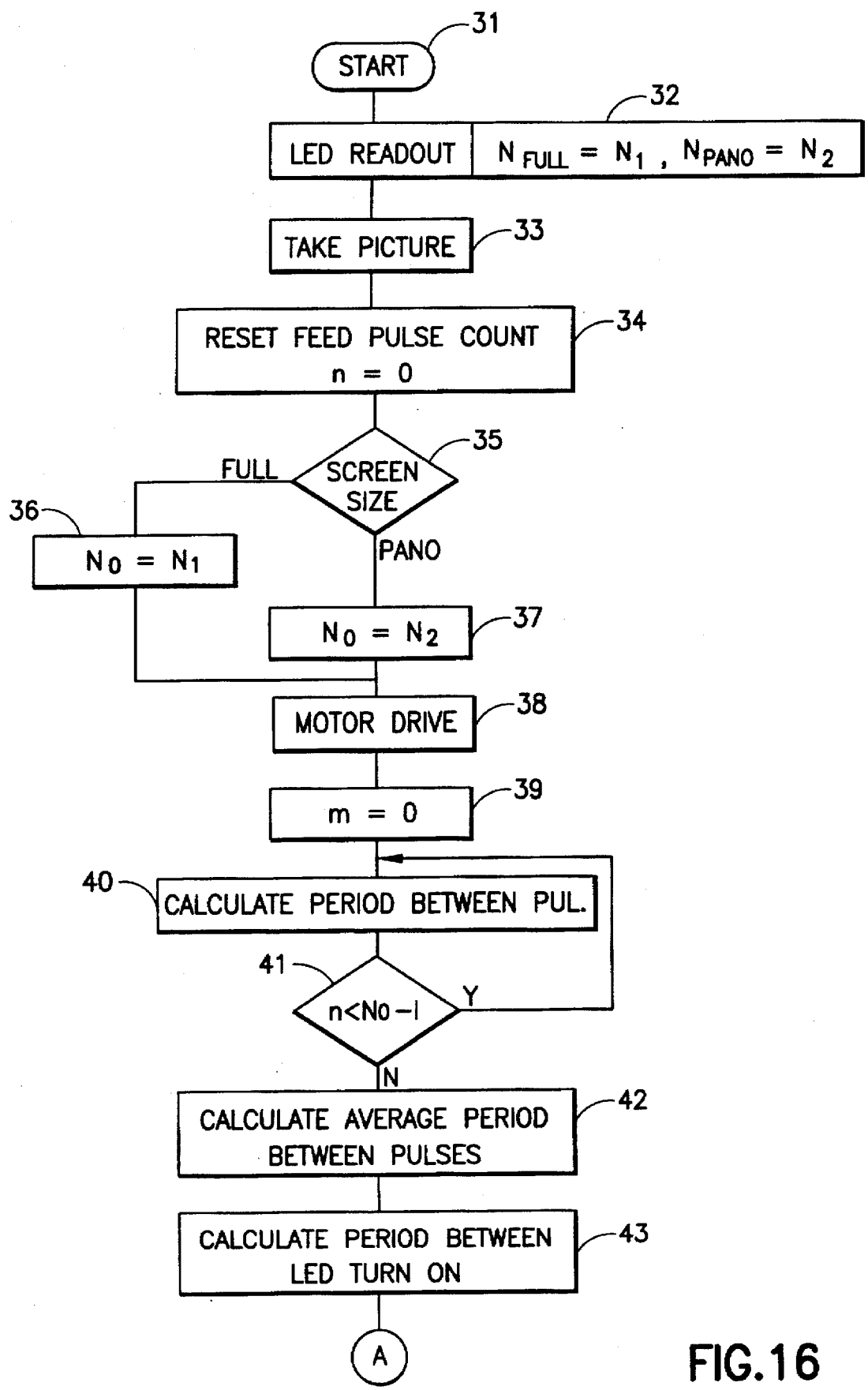
FIGS. 16 and 17 are a flow chart describing the flow of operations according to a second operating system of the invention.
Figure 17:
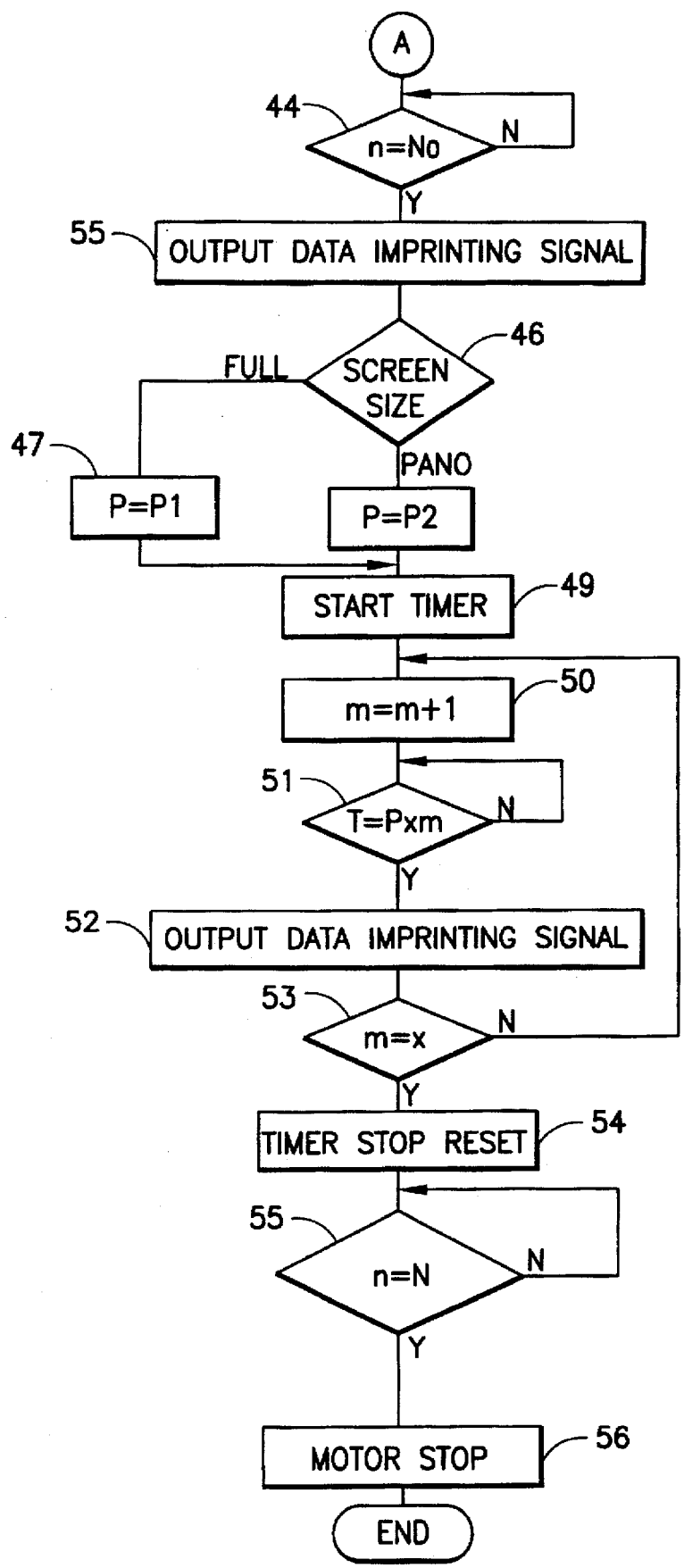

Referring to FIGS. 16 and 17, the flow charts illustrates a further embodiment of a camera equipped with a data imprinting device according to the present invention.

In step 31, the process of taking a picture starts in response, for example, to pressing a button. The exposure is made.

In step 32, a delay number is generated for establishing the position at which imprinting will begin on film F. The delay number is N1 for full size and N2 for panorama size.

In step 33, the shutter is opened, and a picture is taken.

In step 34, the feeding pulse signal is reset to 0.

In step 35, the screen size, full or panorama, is detected.

When the size is full size, NO is set equal to N1 in step 36. When the size is panorama size, N0 is set equal to N2 in step 37.

In step 38, film advance begins by enabling the film advance drive motor.

In step 39, m is set to 0, where m is the number X of output of data imprinting signals required to imprint data. In order to generate the numeral "8" in FIGS. 12a and 12b, X is set equal to 9.

In step 40, the period between feeding pulse signals is measured. In step 41, if the number n of feeding pulse signals is smaller than N0−1, go back to step 40. If the number n of feeding pulse signals is equal to N0−1, the average of the period is obtained in step 42.

In step 43, the period P to turn on LEDs between a first and a second feeding pulse signal is calculated. In this case, P is equal to P1 at full size and to P2 at panorama size.

In step 44, it is determined whether or not the number n of feeding pulse signals is equal to N0. If the number is equal to N0, the data imprinting signals are output and the selected LEDs are turned on in step 45.

In step 46, it is determined whether the screen size is full size or panorama size. If it is full size, go to step 47 and set P equal to P1. If it is panorama size, go to step 48 and set P equal to P2.

In step 49, a timer is started.

In step 50, let m=m+1.

In step 51, it is determined whether or not the count of timer is equal to the period P multiplied by m. If the count is equal to this product, the data imprinting signals are output and the LEDs are turned on in step 52.

In step 53, it is determined whether or not m=X. If this equality is not true, go back to step 50. In turn, if m=X, stop the timer and reset in step 54.

In step 55, it is determined whether the number n of feeding pulse signals is equal to N. If this is true, in step 56, stop the feeding motor and finish imprinting data.

In this embodiment, since the output of data imprinting signals is controlled by timing after imprinting data, this embodiment provides easier control.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A camera comprising:

a camera body having opposed from and back surfaces;

at least one film spool including a film advance motor for rotating said at least one film spool;

a screen size changing frame movable between a first screen size position and a second screen size position;

a pulse signal generator generating a feeding pulse signal responsive to a rate of advancement of a film being wound about said at least one film spool;

said film advance motor rotating said at least one film spool responsive to said feeding pulse signal;

a controller;

said controller generating a first data imprinting signal having a first frequency;

said controller generating a second data imprinting signal having a second frequency;

said first frequency and said second frequency responsive to said feeding pulse signal;

light emitting elements;

said light emitting elements being positioned to expose a portion of said film to light emitted from said light emitting elements, responsive to one of said first and second data imprinting signals, thereby imprinting data in said portion on said film during rotation of said at least one film spool by said film advance motor;

at least a portion of said light emitting elements is disposed in a generally triangular space, adjacent said at least one spool, defined by said camera body back surface, whereby an outside dimension of said camera is reduced.

2. Apparatus according to claim 1, wherein a light emitting element lens assembly is movably mounted in said camera body for movement between a third position and a fourth position;

said controller controlling a position of said light emitting element lens assembly responsive to said screen size changing frame.

3. Apparatus according to claim 1, wherein said lens assembly focusses at a first character height and width when said first screen size is selected, and a second character height and width when said second screen size is selected, said character height and width having substantially the same proportions in both said first screen size and said second screen size.

4. Apparatus according to claim 2, wherein:

said controller begins said imprinting a first predetermined time after a beginning of said feeding pulse signal, when said first screen size is selected;

said controller begins imprinting a second predetermined time after said beginning of said feeding pulse signal, when said second screen size is selected; and said first and second times are different.

5. Apparatus according to claim 4, wherein said first predetermined time is about twice said second predetermined time.

6. A camera comprising:

a camera body;

a plurality of light emitting elements mounted within said camera body;

a lens assembly focussing light emitted from said plurality of light emitting elements on a film surface of a photosensitive means held in said camera body;

said light emitted from said plurality of light emitting elements forming imprinted data on said film surface;

a shutter for selectively exposing said film surface to light from an object to be photographed;

a spool;

said film being wound on said spool;

a data imprinting window disposed closer to the center of the spool than a plane A, which plane is in contact with the maximum diameter of said film wound on said spool and is perpendicular to said film surface; and said lens assembly being mounted in a roughly triangular region defined by a wall of a spool chamber, perpendicular to said film surface; and a surface of the main camera body parallel to said film surface and closest to said film surface;

said triangular region disposed closer to the center of said spool than said plane A;

whereby an outside dimension of said camera is reduced.

7. A camera according to claim 6, further including:

at least one film pressing roller;

said at least one film pressing roller being resiliently mounted on said camera body such that said at least one film pressing roller maintains resilient contact with a surface of said photosensitive means wound on said spool;

a space for said at least one film pressing roller retractably arranged directly below said roughly triangular region in which said optical means are stored; and, said at least one film pressing roller being urged into said roughly triangular region when a diameter of said photosensitive means wound on said spool approaches said circle having a diameter proportional to the maximum diameter of said photosensitive means wound on said spool.

8. Apparatus for imprinting data in a camera, said camera being of a type capable of exposing a photosensitive medium in at least a full size mode and a panorama mode, comprising:

a first pulse generator generating first pulses having a first frequency;

a spool capable of winding said photosensitive medium including a film advance motor for advancing said photosensitive medium along a film plane and onto said spool;

a data imprinting window disposed closer to the center of said spool than a plane A, which plane is in contact with the external form of said photosensitive medium and is perpendicular to said film plane;

a roller arranged on a plane parallel to said film plane, in a position directly below and in front of said data imprinting window of said film plane in a direction perpendicular to said film plane;

a second pulse generator generating second pulses having a second frequency;

said second frequency being at least twice said first frequency, such that for each of said first pulses there are at least a first one and a second one of said second pulses;

a controller capable of energizing a plurality of sources of light in a pattern, responsive to said first one of said second pulses, effective to imprint a first pattern of data on said photosensitive medium;

said controller being capable of energizing said plurality of sources of light in a pattern, responsive to said first one and said second one of said second pulses, effective to imprint a second pattern of data on said photosensitive medium; and said first pattern having a length substantially equal to an integral multiple of said second pattern.

* * * * *